W. E. ANDERSEN.
PILOT LAMP OPERATING MECHANISM.
APPLICATION FILED OCT. 21, 1911.

1,037,816.

Patented Sept. 3, 1912.
2 SHEETS—SHEET 1.

Witnesses:
Christ Feinle, Jr.

Inventor,
Wilford E. Andersen
By Victor J. Evans,
Attorney

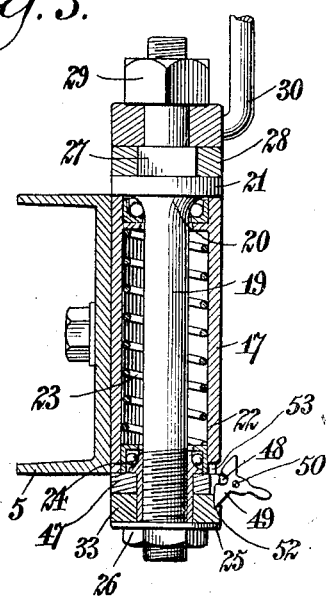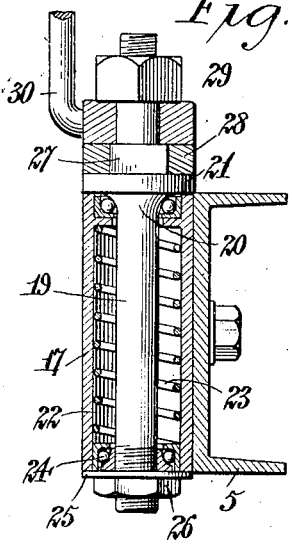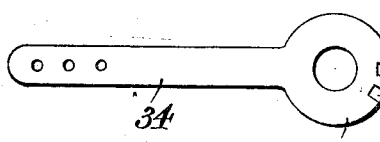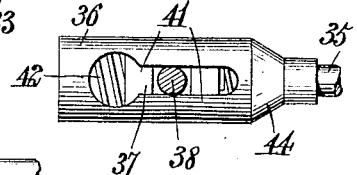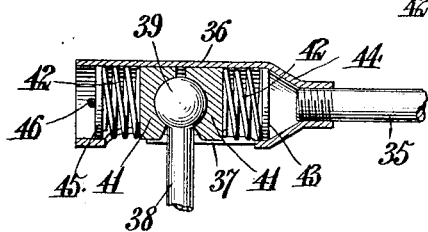

UNITED STATES PATENT OFFICE.

WILFORD E. ANDERSEN, OF EMMETT, IDAHO.

PILOT-LAMP-OPERATING MECHANISM.

1,037,816.   Specification of Letters Patent.   Patented Sept. 3, 1912.

Application filed October 21, 1911. Serial No. 656,059.

*To all whom it may concern:*

Be it known that I, WILFORD E. ANDERSEN, a citizen of the United States, residing at Emmett, in the county of Canyon and State of Idaho, have invented new and useful Improvements in Pilot-Lamp-Operating Mechanism, of which the following is a specification.

The invention relates to lamp controlling mechanism, and more particularly to the class of automatic lamp operating mechanism for automobiles or other self-propelled vehicles.

The primary object of the invention is the provision of lamp operating mechanism in which the lamps at the forward end of an automobile may be turned simultaneously with the turning of the front wheels thereof, so as to throw the light in the direction in which the vehicle is steered.

Another object of the invention is the provision of lamp operating mechanism in which the lamps may be automatically turned or held stationary, and when turned will cast or throw the light in the direction in which the automobile or other vehicle is traveling, thereby avoiding head-on collisions, or other accidents resultant from the failure of the light being thrown in the path of travel of the automobile or the like, when rounding curves or being deflected from a straight course.

A further object of the invention is the provision of lamp operating mechanism of this character adapted to be mounted upon the automobile and connected with the steering mechanism, whereby the lamps may be turned by said mechanism for directing the light therefrom in the same direction of travel of the vehicle, the mechanism being simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

Figure 1:
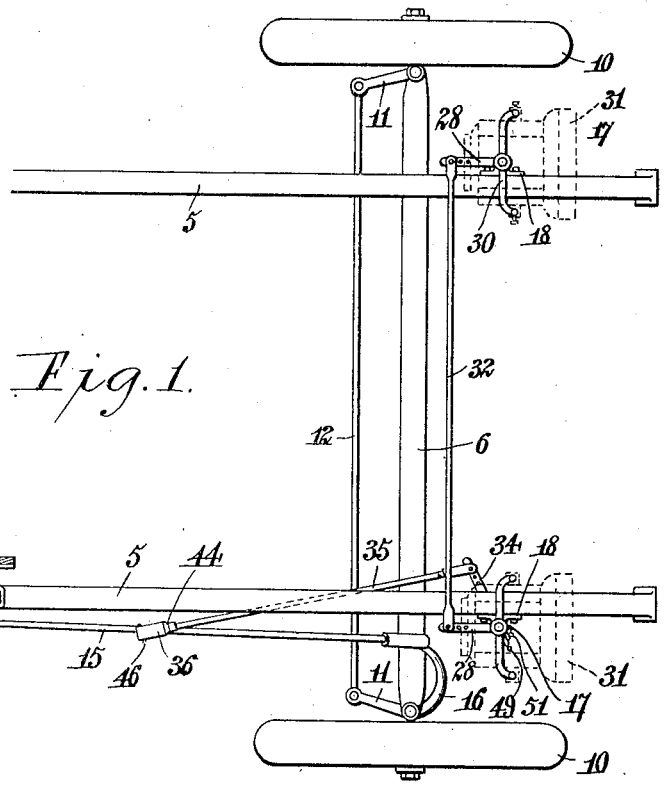
Figure 2:
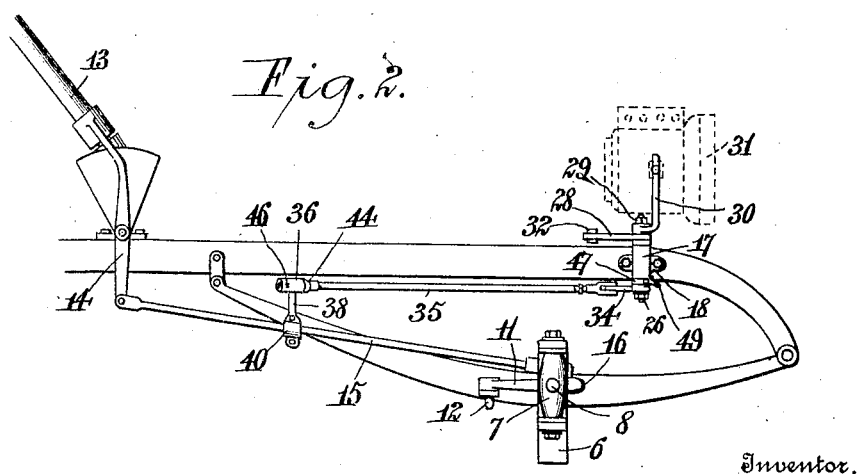

In the drawings, Figure 1 is a perspective view of the front portion of an automobile frame, showing the steering mechanism connected therewith constructed in accordance with the invention. Fig. 2 is a fragmentary side elevation thereof. Fig. 3 is a vertical sectional view through the supporting sleeve or housing for one of the turning posts supporting the lamp bracket. Fig. 4 is a similar view through the other sleeve or housing. Fig. 5 is a plan view of one of the crank arms. Fig. 6 is a fragmentary sectional view through the throw rod connection between the crank arm and the steering mechanism of the automobile. Fig. 7 is a plan view of the sleeve shown in Fig. 6.

Similar reference characters indicate corresponding parts throughout the several views of the drawings.

Referring to the drawings by numerals, 5 designates the side bars of the supporting frame of an automobile of any ordinary well-known construction, 6 the stationary front axle having at opposite ends the usual turning knuckles 7 for the axle spindles 8, and 10 the front ground wheels which are journaled upon the spindles 8, the turning knuckles 7 being provided with rearwardly converging arms 11, to which is pivoted, in the usual manner, a connecting rod 12, so that on the turning of one knuckle 7, a similar movement will be imparted to the other knuckle, thereby effecting the turning of the front wheels 10 in the same direction with respect to each other. Mounted in the frame of the automobile is the customary steering post 13 having connections 14 and 15, as usual, with the crank 16 formed on one of the turning knuckles 7, so that upon operating the steering rod 13, the front wheels 10 may be turned in the ordinary well-known manner. The foregoing construction of the automobile is common to most makes of cars and forms no part of the present invention.

The lamp steering mechanism comprises a pair of vertically arranged housings or sleeves 17 formed with bases 18 which are bolted or otherwise secured to the side bars of the automobile frame, at a point forwardly of the stationary axle 6, and in the housings or sleeves 17 are journaled turning posts 19, each being formed with an integral upper cone 20, and a dust cap 21, the said caps 21 being designed to close the upper end of the housings or sleeves 17, while removably fitted on the posts 19 are lower cones 22, the same being acted upon by coiled expansion springs 23 surrounding the posts 19 within the sleeves or housings 17, so as to hold the cones in position for confining bearing balls 24 therebetween. Surrounding the lower ends of the turning posts 19 are the usual washers 25, and threaded on the said lower ends of the posts are lock nuts 26 which prevent the removal of the posts from the sleeves or housings 17 when fitted therein, but permit the free turning thereof.

Formed on the posts, near the upper ends thereof are squared portions 27 which are engaged in squared perforated ends of turning arms 28, the latter being fastened to the upper ends of the posts 19 by means of lock nuts 29 which also connect thereto the forked brackets 30 carrying the usual pilot lamps 31, the turning arms 28 being connected with a connecting rod 32, so that the said posts 19 will be turned in unison for the adjustment of the pilot lamps.

Loosely surrounding one of the posts 19, at the lower end thereof, is the collar end 33 of a turning crank 34, the same having pivotally connected thereto one end of a throw rod 35, the opposite end of which is provided with a tubular fitting 36 provided in one side with an elongated key-hole shaped slot 37, through which projects a stem 38 formed with a ball terminal 39, the said stem carrying a clip 40 bolted thereto, whereby the stem may be adjustably secured to the connection 15 of the steering mechanism of the automobile. Slidably arranged within the tubular fitting 36 at opposite sides of the ball terminal are socketed follower blocks 41, against which work coiled expansion springs 42 located within the said fitting 36, the outer end of one spring working against a washer 43 resting against the contracted portion 44 of the fitting 36, while the other spring has its outer end working against a washer 45 closing the outer open end of the fitting 36, and resting against a cotter pin 46 passed through the said fitting 36, the follower blocks 41 and the springs 42 being designed to serve as a cushioning device for the stem 38, so as to absorb shocks and jars transmitted thereto, during the operation of the steering mechanism of the automobile.

Arranged above the collar end 33 of the turning crank 34 is a split clamping ring 47, the same being formed with spaced parallel ears 48, between which is engaged a swinging latch 49, the same being connected to the ears by means of a bolt member 50 engaged by a winged nut 51, so that the latch may be locked in adjusted position, the latch 49 being adapted for engagement in any one of a plurality of notches 52 formed in the upper face of the collar end 33 of the turning crank 34, so as to lock it with the turning posts 19 on which the clamping collar 47 is secured. When the latch 49 is thrown out of engagement with any one of the notches 52 in the collar end 33 of the turning crank 34, it frees the same from locked engagement with the turning posts, and the said latch 49 will then be thrown into engagement with the notch 53 formed in the lower end of the sleeve housing adjacent thereto. Thus, in this manner, the pilot lamps will be locked stationary, so as to prevent turning thereof, during the operation of the steering mechanism if desired. The reason for providing a plurality of notches 52 in the turning crank 34 is to enable the proper adjustment of the pilot lamps, so that the light may be thrown therefrom during the steering of the automobile in the direction of travel thereof.

From the foregoing, taken in connection with the accompanying drawings, it is thought that the construction and operation of the invention will be readily understood, without requiring a more extended explanation.

What is claimed is:

1. The combination with steering mechanism of an automobile, of tubular housings adapted to be mounted upon the frame of an automobile, turning posts journaled in said housings, means for synchronously operating said posts, lamp supporting brackets fixed to said turning posts, lamps carried by said brackets, a turning crank having a collar loosely engaged with one of said turning posts, a clamping ring resting upon said collar, connections between said steering mechanism and said crank, and means carried by said clamping ring for alternately locking the post to the housing receiving the same and to the turning crank.

2. The combination with the steering mechanism of an automobile, of housings adapted to be mounted upon the frame of an automobile, posts journaled in said housings, a turning crank having a collar loosely engaged with one of said posts, a clamping ring resting upon said collar, connections between said steering mechanism and said crank, and means carried by said clamping ring for alternately locking the post to the housing receiving the same and to the turning crank.

In testimony whereof I affix my signature in presence of two witnesses.

WILFORD E. ANDERSEN.

Witnesses:
 W. T. CROUCH,
 ARCH HOWELL.